(12) United States Patent
Vezain et al.

(10) Patent No.: US 8,550,407 B2
(45) Date of Patent: Oct. 8, 2013

(54) LARGE RIGID DEPLOYABLE STRUCTURES AND METHOD OF DEPLOYING AND LOCKING SUCH STRUCTURES

(75) Inventors: Stéphane Vezain, Mandelieu (FR); Yannick Baudasse, Grasse (FR); Nicolas Dando, La Roque D'Antheron (FR); Ludovic Schreider, Fonsorbes (FR)

(73) Assignee: Thales, Neuilly sur Seine (FR)

( * ) Notice: Subject to any disclaimer, the term of this patent is extended or adjusted under 35 U.S.C. 154(b) by 59 days.

(21) Appl. No.: 13/333,744

(22) Filed: Dec. 21, 2011

(65) Prior Publication Data
US 2012/0325973 A1 Dec. 27, 2012

(30) Foreign Application Priority Data
Dec. 23, 2010 (FR) ...................... 10 05093

(51) Int. Cl.
*B64G 1/22* (2006.01)
(52) U.S. Cl.
USPC ...................... 244/172.6; 244/173.3; 136/245
(58) Field of Classification Search
USPC ................................ 244/172.6; 136/245, 292
See application file for complete search history.

(56) References Cited

U.S. PATENT DOCUMENTS

| | | | |
|---|---|---|---|
| 3,326,497 A | | 6/1967 | Michelson |
| 3,677,508 A | * | 7/1972 | Dillard et al. ............... 244/172.7 |
| 3,733,758 A | * | 5/1973 | Maier et al. ...................... 52/113 |
| 4,015,653 A | * | 4/1977 | Slysh et al. ..................... 160/213 |
| 4,116,258 A | * | 9/1978 | Slysh et al. ..................... 160/213 |
| 4,151,872 A | * | 5/1979 | Slysh et al. ..................... 160/213 |
| 4,725,025 A | * | 2/1988 | Binge et al. ................. 244/172.6 |
| 4,832,113 A | * | 5/1989 | Mims et al. ...................... 165/41 |
| 5,319,905 A | * | 6/1994 | Szirtes ............................. 52/108 |
| 5,520,747 A | * | 5/1996 | Marks ........................... 136/245 |
| 5,810,296 A | * | 9/1998 | Izumi ......................... 244/172.9 |
| 5,927,654 A | * | 7/1999 | Foley et al. ................. 244/172.6 |
| 6,091,016 A | * | 7/2000 | Kester ............................ 136/245 |
| 6,284,966 B1 | * | 9/2001 | Simburger et al. ........... 136/244 |
| 6,343,442 B1 | * | 2/2002 | Marks .............................. 52/71 |

(Continued)

FOREIGN PATENT DOCUMENTS

| | | |
|---|---|---|
| EP | 0754625 A1 | 1/1997 |
| JP | 2006160064 A | 6/2006 |
| JP | 2008221876 A | 9/2008 |

*Primary Examiner* — Christopher P Ellis
*Assistant Examiner* — Medhat Badawi
(74) *Attorney, Agent, or Firm* — Baker & Hostetler LLP

(57) ABSTRACT

The invention is situated in the field of telecommunication satellites. A deployable structure with which such a satellite may be equipped and a method of deploying the deployable structure is provided. The deployable structure includes: a set of primary panels, a set of secondary panels, primary articulation systems, each primary articulation system enabling a primary panel to be caused to pivot relative to another primary panel about a primary axis, the primary axes being substantially parallel to the primary panels, and secondary articulation systems, each secondary articulation system being associated with a secondary panel and enabling said panel to be caused to pivot relative to another panel about a secondary axis parallel to said panels, the deployable structure being configured in such a manner that, in a deployed configuration, the front surfaces of the panels form a substantially continuous overall surface.

8 Claims, 11 Drawing Sheets

(56) References Cited

U.S. PATENT DOCUMENTS

| | | | |
|---|---|---|---|
| 6,437,232 B1* | 8/2002 | Dailey et al. | 136/245 |
| 6,581,883 B2* | 6/2003 | McGee et al. | 244/172.6 |
| 6,910,304 B2* | 6/2005 | Warren | 52/108 |
| 7,023,962 B2* | 4/2006 | Xu et al. | 378/147 |
| 8,308,111 B2* | 11/2012 | Lu et al. | 244/172.7 |
| 2003/0015625 A1* | 1/2003 | McGee et al. | 244/173 |
| 2008/0290222 A1* | 11/2008 | Aston et al. | 244/173.3 |
| 2009/0230250 A1* | 9/2009 | Wehner et al. | 244/172.7 |
| 2009/0282646 A1* | 11/2009 | Baudasse et al. | 16/273 |
| 2012/0325974 A1* | 12/2012 | Baudasse et al. | 244/172.6 |

\* cited by examiner

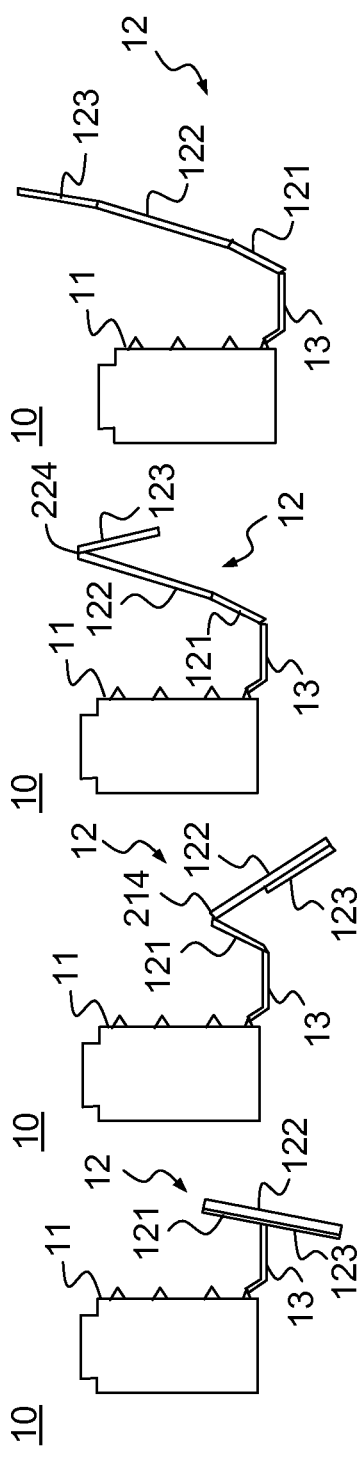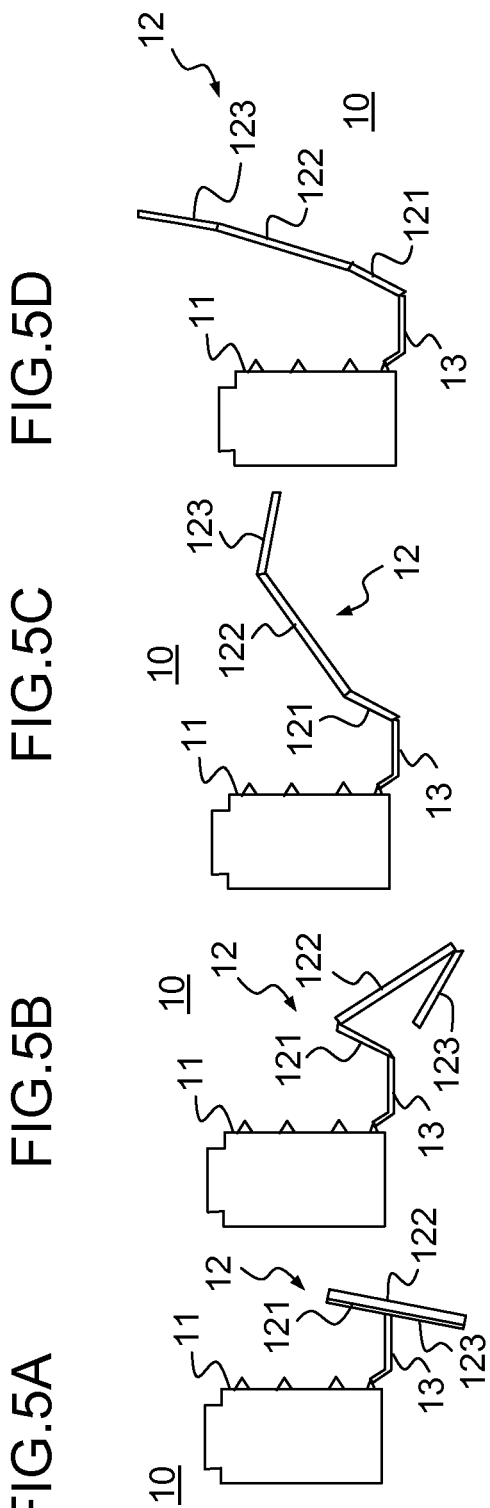

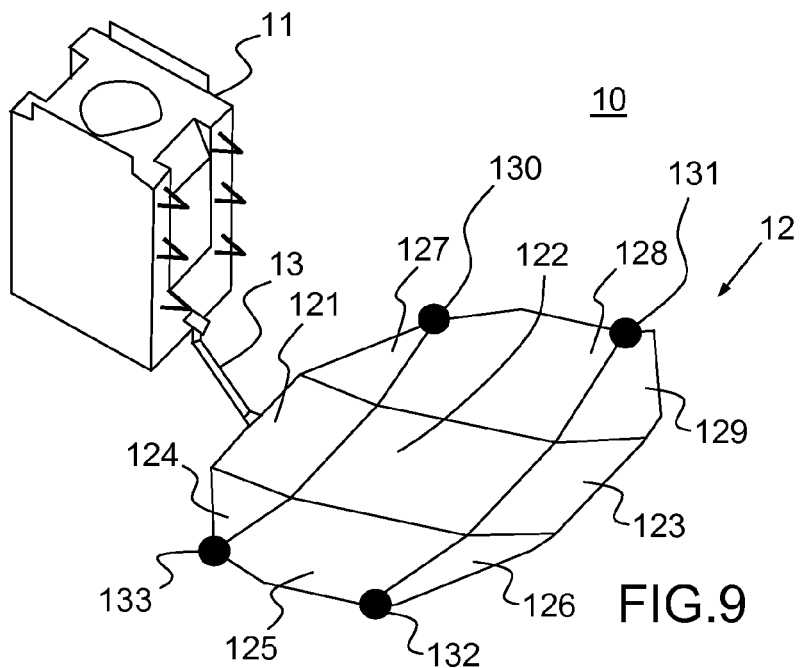
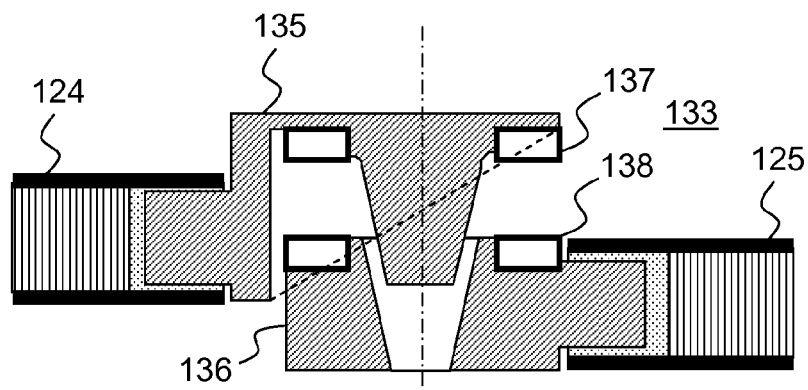
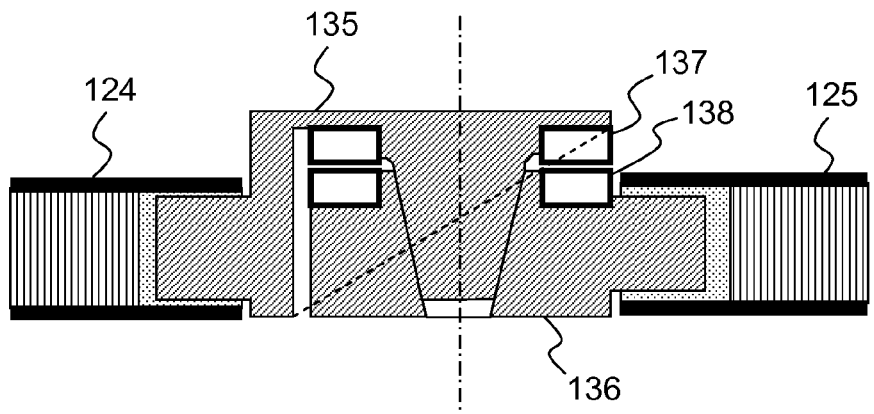

LARGE RIGID DEPLOYABLE STRUCTURES AND METHOD OF DEPLOYING AND LOCKING SUCH STRUCTURES

CROSS-REFERENCE TO RELATED APPLICATION

This application claims priority to foreign French patent application No. FR 1005093, filed on Dec. 23, 2010, the disclosure of which is incorporated by reference in its entirety.

FIELD OF THE INVENTION

The invention is situated in the field of large deployable structures and more particularly in that of radio-frequency antenna reflectors with which telecommunication satellites may be equipped. It concerns a large deployable structure constituted of rigid frames or panels and a method of deploying and locking that structure.

BACKGROUND

Large deployable structures constituted of rigid frames or panels are increasingly present on all satellites. Missions are increasingly "greedy" for energy because they carry increasingly powerful payloads. This imposes increasingly large solar generators and antennas. Of these structures, there may be cited solar generators for supplying the spacecraft with electrical energy, faceted antenna reflectors for reflecting radio-frequency (RF) waves, faceted optical reflectors such as mirrors, solar or thermal shields aiming to protect certain sensitive instruments (for example optical instruments). These structures may or may not be equipped with extender arms as a function of the requirement to position the active element of the structure relative to the satellite for the mission. In practice, the dimensions of these structures are limited by the volume available under the nose cone of the launch vehicle for placing the satellite in orbit. Of course, such structures cannot be placed in their operational configuration under the nose cone of the launch vehicle. Consequently, it must be possible to fold a large structure on itself into a stowed configuration for launch, so as to have the lowest possible volume, and to be able to assume a deployed configuration in the operational phase, in which its dimensions are greater. In this deployed configuration, in order to make possible control of the spacecraft, it is generally required that the large structure be as rigid and as stable as possible once deployed. Furthermore, this type of structure is intended to accomplish certain specific functions linked to the mission. For a solar generator, the active face must typically be equipped with solar cells. For thermal and solar shields, the active surface must be as homogeneous in terms of temperature as possible to protect and facilitate thermal regulation of instruments positioned in the area facing the sun. In the case of antennas, the active surface must be free of any metal surface or appendages in order to have optimum RF performance. In all cases, the aim is to minimize the presence of mechanical elements on the active face.

SUMMARY OF THE INVENTION

The present invention aims to provide a deployable structure enabling all or some of the aforementioned requirements to be addressed. In particular, it aims to provide a deployable structure that is able to go from a stowed configuration to a deployed configuration that guarantees a certain stiffness and good stability. To this end, the invention consists in a deployable structure with which a spacecraft may be equipped, which includes:
  a set of primary panels,
  a set of secondary panels,
each primary and secondary panel including a substantially plane front surface,
  primary articulation systems, each primary articulation system enabling a primary panel to be caused to pivot relative to another primary panel about a primary axis, the primary axes being substantially parallel to the front surfaces of the primary panels, and
  secondary articulation systems, each secondary articulation system being associated with a secondary panel and enabling said secondary panel to be caused to pivot relative to a primary panel or a secondary panel about a secondary axis substantially parallel to the front surfaces of said panels, the deployable structure being configured in such a manner that, in a deployed configuration, the front surfaces of the primary and secondary panels form a substantially continuous overall surface.

The advantages of the invention are notably:
  it enables an active surface of any shape to be obtained from flat panels,
  it enables an active surface to be obtained free of metal elements such as articulations, for example,
  it enables a high stability of positioning to be guaranteed.

In one particular embodiment of the deployable structure, the primary and secondary panels comprise a rigid frame covered with at least one flexible substrate or a panel forming the front surface.

The invention also consists in a method of deploying a deployable structure with which a spacecraft may be equipped, including:
  a set of primary panels,
  a set of secondary panels,
each primary and secondary panel including a substantially plane front surface and a substantially plane rear surface parallel to the front surface of said panel, the deployable structure being able to assume a stowed configuration in which the rear surface of each primary panel faces the rear surface of another primary panel and in which the rear surface of each secondary panel faces the rear surface of another primary or secondary panel.

The deployment method includes the following steps for deploying the deployable structure from its stowed configuration:
  causing each primary panel to pivot about a primary axis relative to the primary panel the rear surface of which faces its rear surface, the primary axes being substantially parallel to the front surfaces of the primary panels,
  causing each secondary panel to pivot about a secondary axis relative to the panel the rear surface of which faces its rear surface, the secondary axes being substantially parallel to the front surfaces of the panels concerned, the primary and secondary panels being driven in rotation into a deployed configuration in which the front surfaces of the panels form a substantially continuous overall surface.

BRIEF DESCRIPTION OF THE DRAWINGS

The invention will be better understood and other advantages will become apparent on reading the following description given with reference to the appended drawings, in which:

FIGS. 5A to 5D show a first primary panel deployment kinematic;

FIGS. 6A to 6D show a second primary panel deployment kinematic;

FIG. 9 shows diagrammatically the FIG. 1 satellite, in which panels of the reflector are connected by peripheral locking systems;

FIGS. 10A and 10B show an example of a peripheral locking system between two secondary panels at the end of deployment and in a deployed configuration and a locked configuration, respectively;

DETAILED DESCRIPTION

Figure 1:
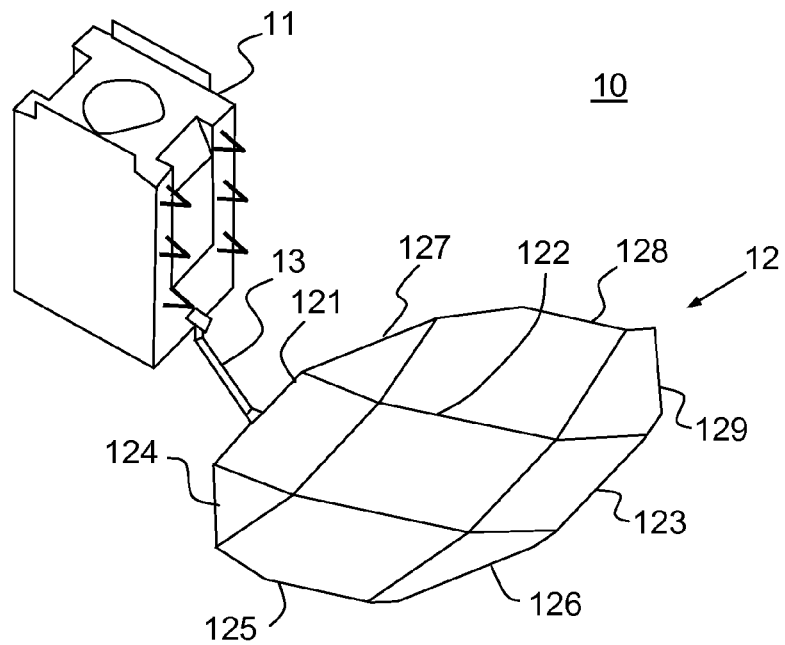
FIG. 1 shows diagrammatically a telecommunication satellite equipped with a first example of a parabolic reflector of the invention in a deployed configuration.

FIG. 1 shows diagrammatically a telecommunication satellite equipped with a first example of a parabolic reflector in a deployed configuration. It is generally considered that the deployed configuration of a deployable structure such as a reflector is the configuration in which that deployable structure is operational. Conversely, it is considered that the stowed configuration of a deployable structure is the configuration in which it may be placed under the nose cone of a launch vehicle able to place the satellite in orbit. The telecommunication satellite 10 includes a body 11, a reflector 12 of substantially parabolic shape, and an arm 13, for example of tubular shape, connecting the reflector 12 to the body 11. The arm 13 notably enables the reflector 12 to be moved away from the body 11 during its deployment. This arm 13 may equally be constituted of a panel similar to those used for the antenna reflector 12. The reflector 12 includes three primary panels 121, 122 and 123 and six secondary panels 124 to 129. Each panel 121 to 129 has a substantially plane reflective surface and a substantially plane rear surface parallel to the reflective surface. The reflective surface is treated so as to be able to reflect electromagnetic radiation in a predetermined band of frequencies, chosen as a function of the target application. In the deployed configuration, the primary panels 121 to 123 and the secondary panels 124 to 129 are arranged so that their reflective surfaces form a substantially continuous overall reflective surface close to a reference parabolic surface. This reflective surface is called the overall reflective surface 12A. The expression substantially continuous surface means that the reflective surfaces are contiguous to each other. In other words, there are no gaps between the panels 121 to 129. Because the reflective surfaces of the panels 121 to 129 are plane surfaces, the overall reflective surface 12A cannot be strictly parabolic. It is a faceted surface. In the FIG. 1 embodiment, the reflective surface of each primary panel 121 to 123 is rectangular. The primary panel 122 abuts the primary panel 121 on one side and the primary panel 123 on the opposite side. The secondary panels 125 and 128 abut the primary panel 122 on its free sides, perpendicular to the sides that the primary panels 121 and 123 abut. The secondary panels 124 and 127, 126 and 129 respectively abut the primary panels 121 and 123 on two opposite sides of these primary panels 121 and 123 perpendicular to the side which the primary panel 122 abuts. The reflective surface of the secondary panels 124 to 129 is shaped so that the overall reflective surface 12A has the required shape. By way of example, the reflector 12 is considered to form a parabola with a diameter of 6 metres and a focal length of 4.5 metres. Each panel 121 to 129 is then inclined at an angle of approximately 11° to a contiguous panel. FIG. 1 shows only one embodiment of a reflector of the invention. The primary panels 121 to 123 are not necessarily rectangular and the reflector 12 may include a greater number of panels. More generally, the reflector 12 may be such that the sides of the primary panels that abut each other are substantially parallel to each other. The secondary panels abut the free sides of the primary panels. They may equally abut each other, for example on sides perpendicular to the side on which these secondary panels abut the primary panel.

Figure 2:
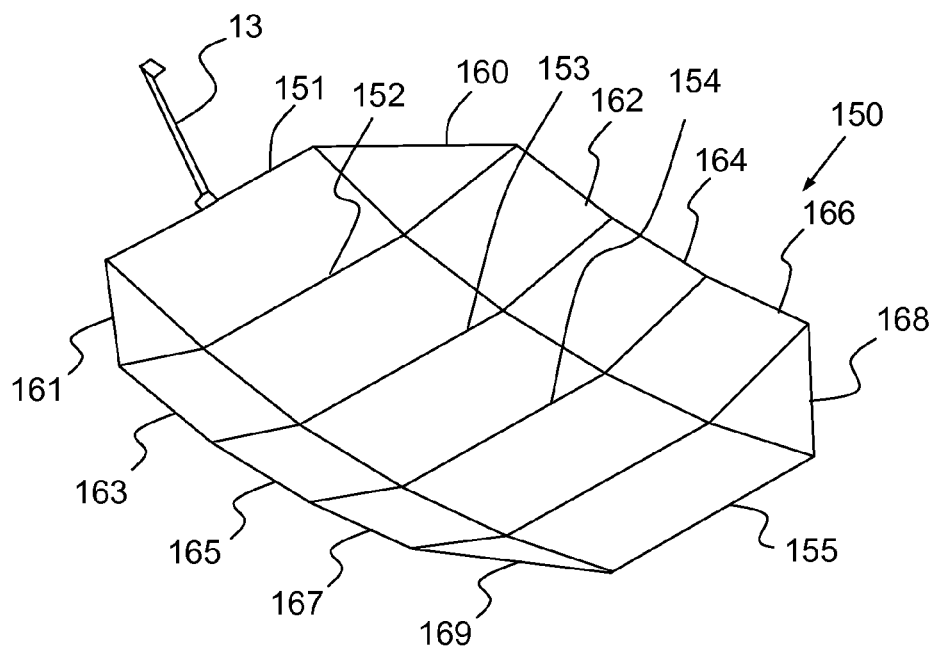
FIG. 2 shows a second example of a parabolic reflector of the invention in a deployed configuration.

FIG. 2 shows diagrammatically an example of a very large parabolic reflector of the invention in the deployed configuration. The reflector 150 differs from the FIG. 1 reflector in that it includes five primary panels 151 to 155 and ten secondary panels 160 to 169. In the deployed configuration, the panels 151-155 and 160-169 are arranged so that their reflective surfaces form a substantially continuous overall reflective surface close to a reference parabolic surface. The primary panels 151-155 abut each other on sides parallel to each other. The secondary panels 160 and 161 abut the primary panel 151 on the free sides of that panel, perpendicular to the side on which the primary panel 151 abuts the primary panel 152. The secondary panels 162 and 163 abut the primary panel 152 on the free sides of that panel. In the same manner, the secondary panels 164 and 165, 166 and 167, 168 and 169 respectively abut the free sides of the primary panels 153 to 155 on each side. The reflective surface of the secondary panels 160-169 is formed in such a manner that the overall reflective surface, comprising the reflective surface of the primary panels 151-155, has the required shape. The reflector 150 may be connected to the body of a satellite, not shown, by the arm 13.

Figure 3:
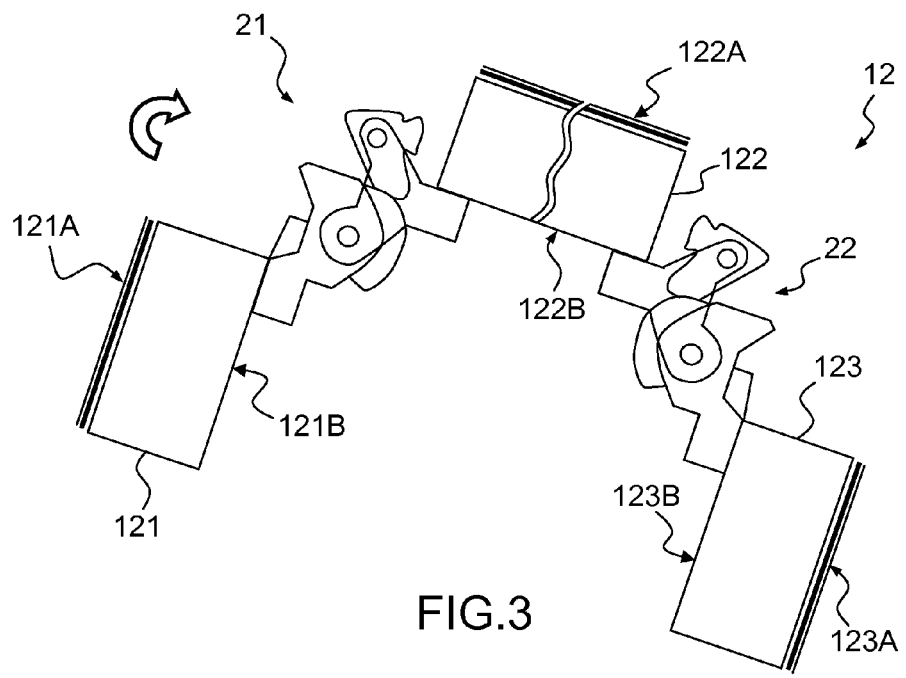
FIG. 3 shows diagrammatically primary panels of the FIG. 1 reflector with primary articulation systems between the primary panels.
Figure 4A:
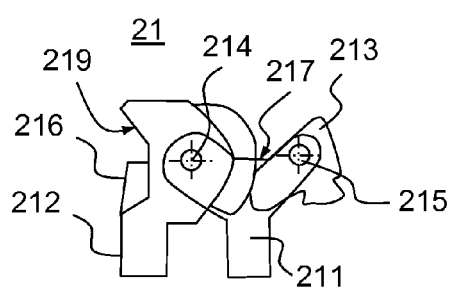
FIGS. 4A to 4D show an example of a primary articulation system in different positions.
Figure 4B:
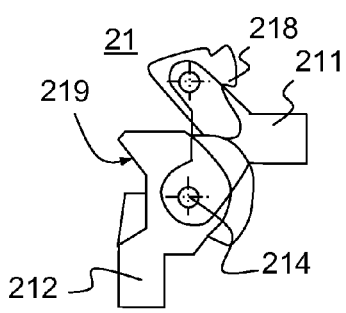
Figure 4C:
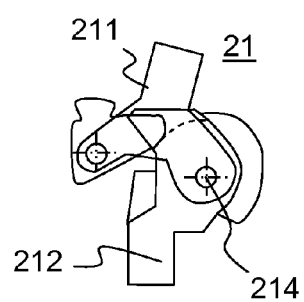
Figure 4D:
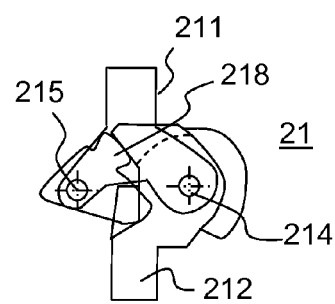

An antenna reflector with which a telecommunication satellite is equipped must be able to go from the stowed configuration to the deployed configuration. In the stowed configuration, the primary and secondary panels are stacked on each other. In the deployed configuration, the panels are deployed in such manner as to form the desired reflective surface. To enable deployment of the panels, the reflector includes articulation systems between the panels, notably between the primary panels. FIG. 3 shows diagrammatically the primary panels of the FIG. 1 reflector with their articulation systems. The term "primary" refers to the articulation systems connecting two primary panels. In FIG. 3, the reflective surfaces of the primary panels 121 to 123 are respectively denoted 121A, 122A and 123A. The rear surfaces are respectively denoted 121B, 122B and 123B. The reflector 12 includes two primary articulation systems. A first primary articulation system 21 connects the primary panels 121 and 122. A second primary articulation system 22 connects the primary panels 122 and 123. Each primary articulation system 21 or 22 must be able to cause a primary panel 121 to 123 to pivot relative to another primary panel about an axis substantially parallel to the surfaces 121A to 123A of the primary panels 121 to 123. The primary panels 121 to 123 may thus be stacked parallel to each other in the stowed configuration. As a function of the length of the panels, notably when the two primary panels 121 and 123 are half the length of the primary panel 122, it is possible to stack the two primary panels 121 and 123 within the same thickness. The volume occupied by the reflector in this configuration is therefore limited. The rotation axes of the primary articulation systems 21 and 22 may furthermore be parallel to each other. This parallelism is not necessary for the invention, however. In one particular embodiment, the articulation systems 21 and 22 are fixed to the primary panels 121 to 123 on their rear surfaces 121B to 123B. In the deployed configuration, this particular embodiment enables masking of the articulation systems 21 and 22 from electromagnetic radiation emitted or received by the antenna and forms a continuous overall reflective surface. This particular embodiment also enables the rear surfaces 121B and 123B to face the rear surface 122B.

FIGS. 4A to 4D show an example of a primary articulation system enabling connection of two primary panels. The primary articulation system 21 is considered by way of example. FIG. 3A shows the primary articulation system 21 in a position corresponding to the stowed configuration of the primary panels 121 and 122; FIGS. 3B and 3C show the articulation system 21 in positions in which the primary panels 121 and 122 are being deployed relative to each other; and FIG. 3D shows the primary articulation system 21 in a position corresponding to the deployed configuration of the primary panels 121 and 122. The primary articulation system 21 includes a first part 211 on which the primary panel 121 is to be mounted, a second part 212 on which the primary panel 122 is to be mounted, and a third part 213 adapted to lock the articulation 21 in the deployed configuration. The second part 212 is pivotally connected to the first part 211 about a first axis 214. The third part is pivotally connected to the first part 211 about a second axis 215 substantially parallel to the first axis 214. The second part 212 includes a fixed stop 216 adapted to come to bear on a bearing surface 217 of the first part 211 in the position corresponding to the deployed configuration of the primary panels 121 and 122, as shown in FIG. 3D. The stop 216 and the bearing surface 217 enable limitation of the rotation movement between the first and second parts 211, 212 once the position corresponding to the deployed configuration is reached. The third part 213 includes a non-return stop 218 adapted to come to bear on a bearing surface 219 of the second part 212 in the position corresponding to the deployed configuration of the primary panels 121 and 122. The non-return stop 218 and the bearing surface 219 enable prevention of rotation movement between the first and second parts 211, 212 toward the stowed position once the deployed position is reached. Thus the primary articulation systems have both a rotation guidance function and a primary panel locking function. They may equally have a drive function consisting in driving the primary panels from the stowed configuration toward the deployed configuration. The driving torque is provided by a spiral spring, for example. Deployment of the primary panels may be triggered by a known prior art pyrotechnic device.

The panels, in particular the primary panels, may be deployed in accordance with different kinematics. FIGS. 5A to 5D show a first, so-called sequenced, kinematic. FIG. 5A shows the satellite 10 when the reflector 12 is in the stowed configuration. Here the primary panels 121 to 123 are folded on each other. In a first step, shown in FIG. 5B, the primary articulation system 21 drives the primary panel 122 in rotation about the axis 214 relative to the primary panel 121 until they are in the deployed configuration relative to each other, as shown in FIG. 5C. For the primary articulation system 21 shown in FIG. 3, this deployed configuration corresponds to the position in which the stop 216 comes to bear on the bearing surface 217 and the non-return stop 218 and the bearing surface 219 lock the relative position of the primary panels 121 and 122. Reaching the deployed configuration of the primary panel 121 relative to the primary panel 122 triggers deployment of the primary panel 123 in a second step. The primary articulation system 22 drives the primary panel 123 in rotation about an axis 224 relative to the primary panel 122 until they are in the deployed configuration relative to each other, as shown in FIG. 5D. For the primary articulation system 22, this deployed configuration corresponds to the position in which the stop of the primary articulation system 22 comes to bear on the corresponding bearing surface. The primary panel 123 is then locked in the deployed configuration.

FIGS. 6A to 6D show a second, so-called synchronized, kinematic. FIGS. 6B and 6C show the satellite 10 when the reflector 12 is being deployed. For the synchronized kinematic, the primary panels 121 to 123 are deployed simultaneously by means of an array of cables and pulleys connecting the various articulations to each other. The arrangement of pulleys with different shapes and diameters enables varied speeds and opening angles to be obtained. The primary articulation system 22 drives the primary panel 123 in rotation about the axis 224 relative to the primary panel 122, independently of the position of the primary panel 122 relative to the primary panel 121. In the same manner as for the sequenced kinematic, each primary panel 121 to 123 is locked at the end of deployment, when it reaches the deployed configuration. The primary panels 121 to 123 may be locked by the primary articulation systems 21 and 22, as described above, for example, or by another locking device, independent of the primary articulation systems.

Figure 7:
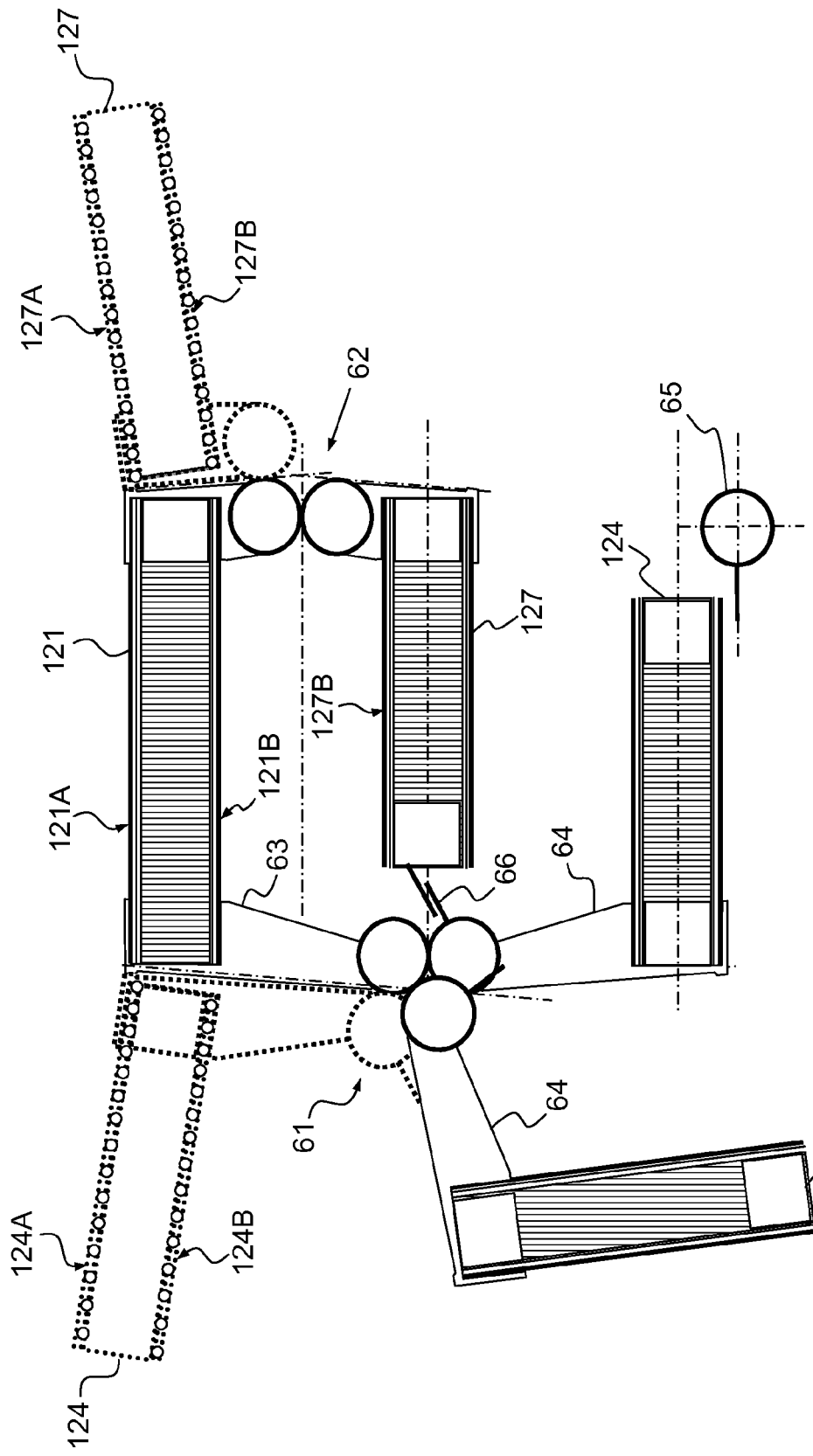
FIG. 7 shows diagrammatically an example of panels connected by secondary articulation systems.

It must equally be possible to deploy the secondary panels to move the reflector 12 from the stowed configuration to the deployed configuration. To this end, the reflector 12 includes so-called secondary articulation systems connecting each secondary panel to a primary panel. FIG. 7 shows diagrammatically an example of panels connected by secondary articulation systems enabling sequenced opening of the secondary panels. The panels being stacked on each other, it is in fact necessary to be able to control the deployment of each secondary panel independently in order to prevent interference. It is considered by way of example to be a question of the panels 121, 124 and 127 as described with reference to FIG. 1. The reflective surfaces of the panels 124 and 127 are respectively denoted 124A and 127A. The rear surfaces are respectively denoted 1248 and 1278. A first secondary articulation system 61 connects the primary panel 121 to the secondary panel 124. It enables the secondary panel 124 to be caused to pivot relative to the primary panel 121 about an axis substantially parallel to the surfaces 121A and 124A of the panels 121 and 124. A second secondary articulation system 62 connects the primary panel 121 to the secondary panel 127. It enables the secondary panel 127 to be caused to pivot relative to the primary panel 121 about an axis substantially parallel to the surfaces 121A and 127A of the panels 121 and 127. The fact that the axes of the secondary articulation systems 61, 62 are substantially parallel to the surfaces 121A and 124A or 121A and 127A enables the panels to be stacked parallel to each other in the stowed configuration. The volume occupied by the reflector 12 in that configuration is therefore limited. The axes of the secondary articulation systems may be substantially orthogonal to the axes of the primary articulation systems. The secondary articulation systems 61 and 62 are advantageously fixed to the panels 121, 124 and 127 on their rear surfaces 121B, 124B and 127B, as shown in FIG. 7. In the deployed configuration, this particular embodiment enables masking of the secondary articulation systems 61 and 62 from electromagnetic radiation emitted or received by the antenna and forms a continuous overall reflective surface. This particular embodiment also enables the rear surfaces 124B and 127B of the secondary panels 124 and 127 to face the rear surface 121B of the primary panel 121. The secondary panels 124 and 127 may be stacked in a common plane or, as in the FIG. 7 example, in different planes. The secondary panels 124 and 127 may then each have dimensions similar to those of the primary panel 121 under which they are stacked in the stowed configuration. To this end, the reflector 12 may include an arm for offsetting one of the secondary panels 124 and 127 so that they are stacked in two different parallel planes. In the FIG. 7 example, the reflector 12 includes a first arm 63 fixed at one end to the primary panel 121 and at another end to the secondary articulation system 61 and a second arm 64 fixed at one end to the secondary articulation system 61 and at another end to the secondary panel 124. In this example, the secondary articulation system 61 may be in the vicinity of the secondary panel 127, so that deployment of the secondary panel 124 may trigger deployment of the secondary panel 127. In particular, a first trigger device 65 may be fixed to the primary panel 121, and more particularly to the non-return stop 218, and disposed in such manner as to be able on command to release rotation of the secondary panel 124 relative to the primary panel 121. A second trigger device 66 may be fixed to the secondary panel 124 and disposed in such manner as to be able to free rotation of the secondary panel 127 relative to the primary panel 121 with the deployment of the secondary panel 124. The same articulation systems as those described with reference to FIG. 7 may be used to articulate the secondary panels 125 and 128 relative to the primary panel 122 and the secondary panels 126 and 129 relative to the primary panel 123. In structural terms, the secondary articulation systems may be similar to the primary articulation systems. Moreover, the reflector of the invention may include a greater number of secondary panels per primary panel. In particular, the reflector may include secondary panels articulated in series to one or more sides of a primary panel. Some secondary articulation systems then connect secondary panels to other secondary panels. The secondary articulation systems may be fixed to the secondary panels in such a manner that the rear surfaces of two contiguous secondary panels face each other in the stowed configuration.

Figure 8A:
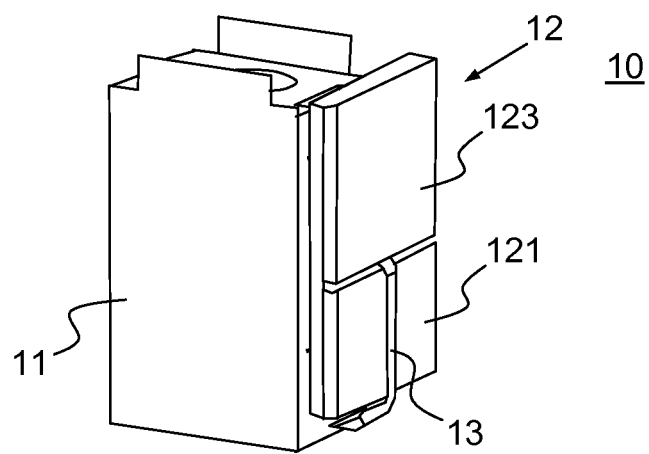
FIGS. 8A to 8H show an example of a primary and secondary panel deployment kinematic for the FIG. 1 reflector.
Figure 8B:
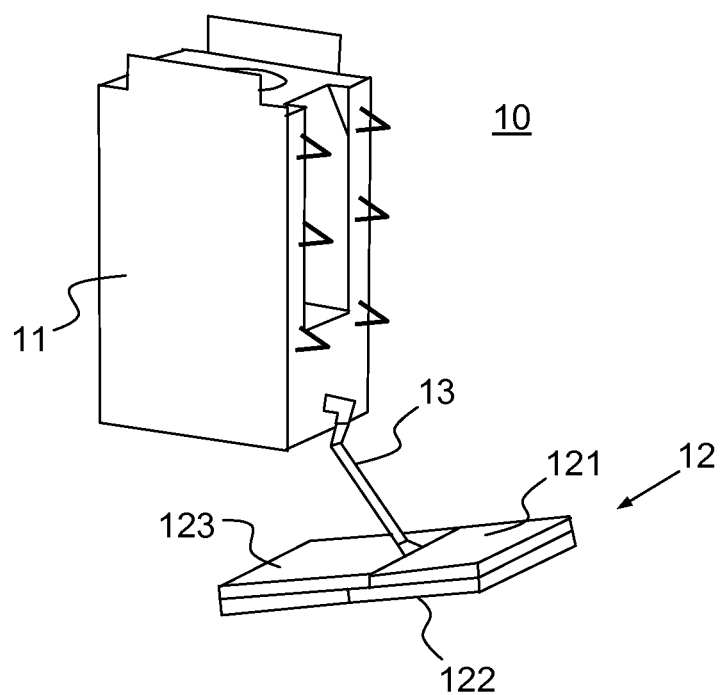
Figure 8C:
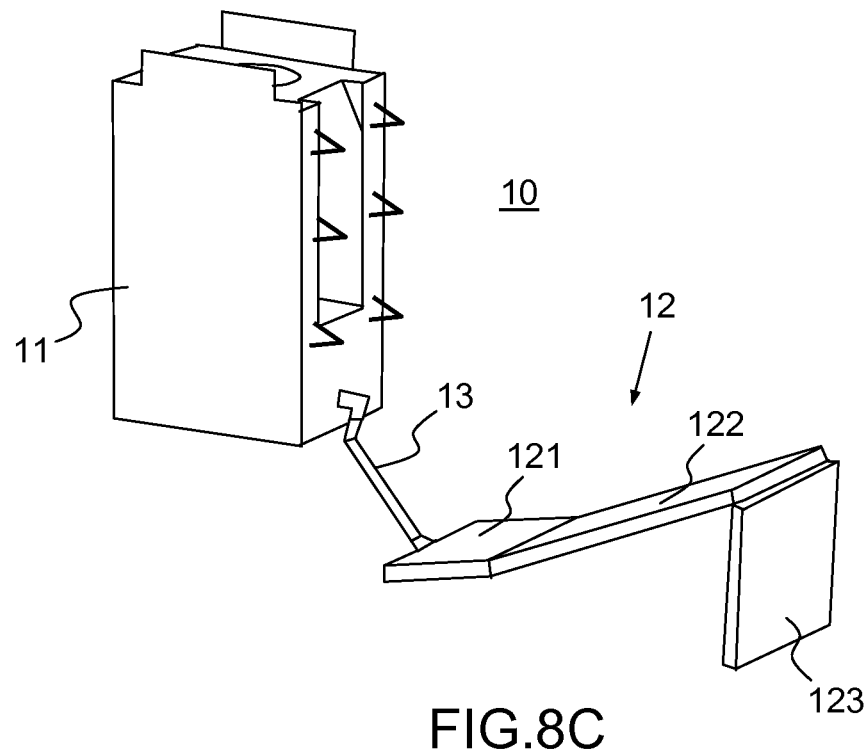
Figure 8D:
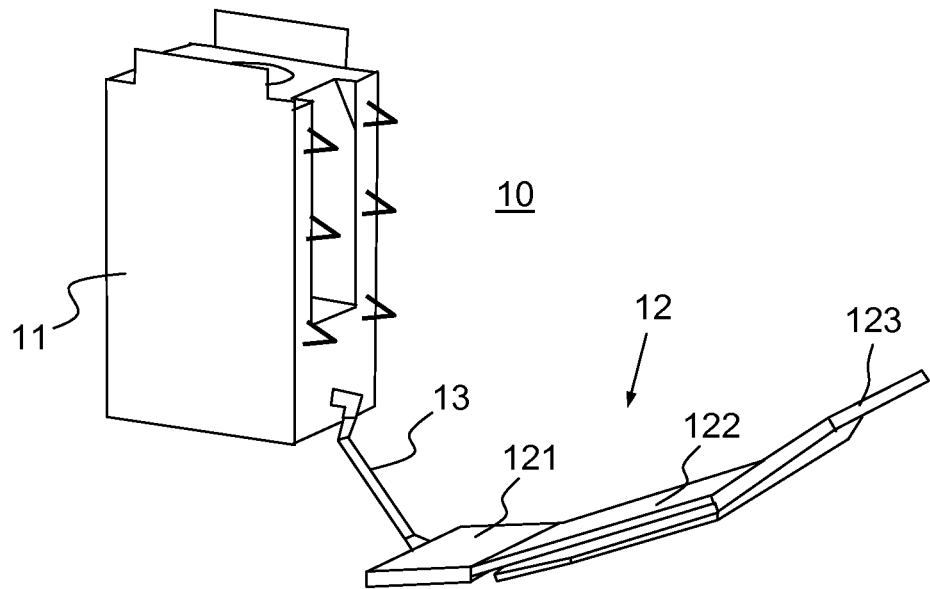
Figure 8E:
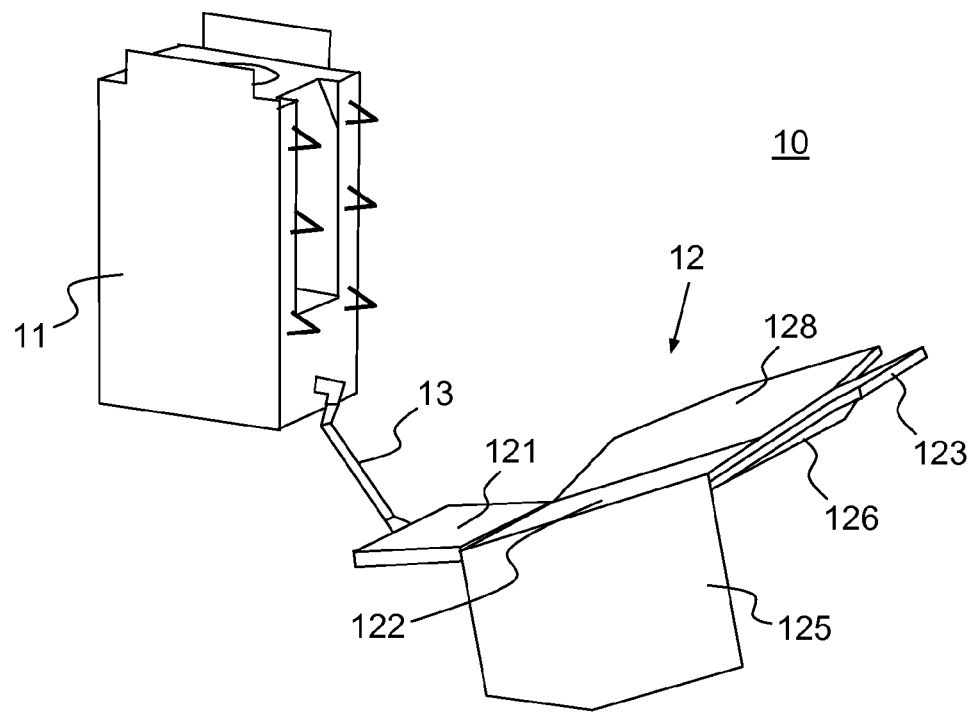
Figure 8F:
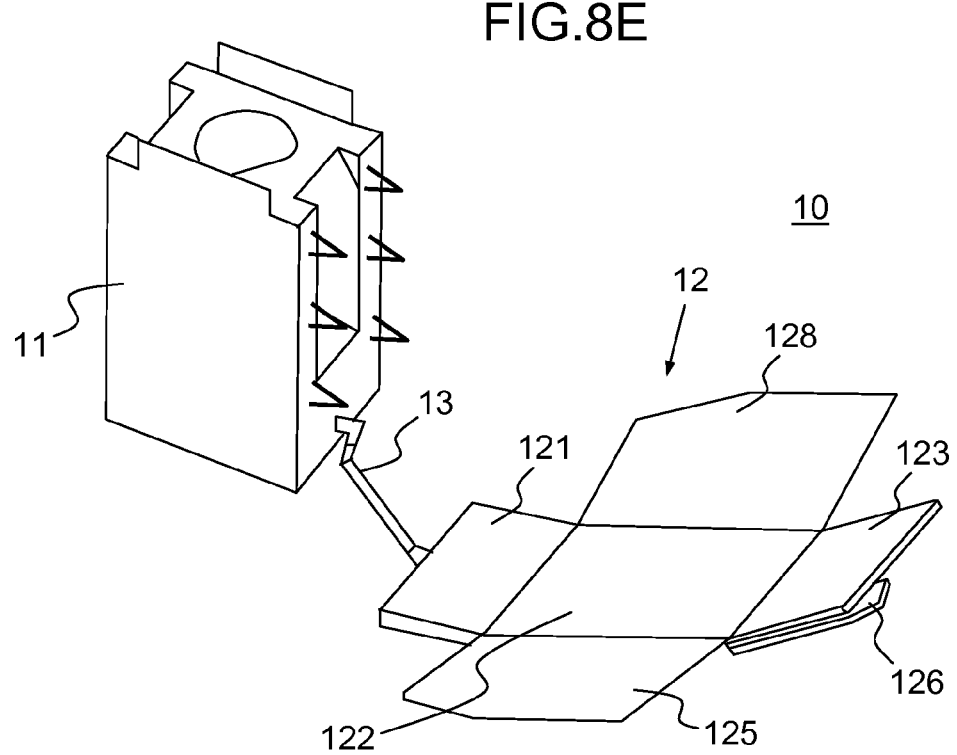
Figure 8G:
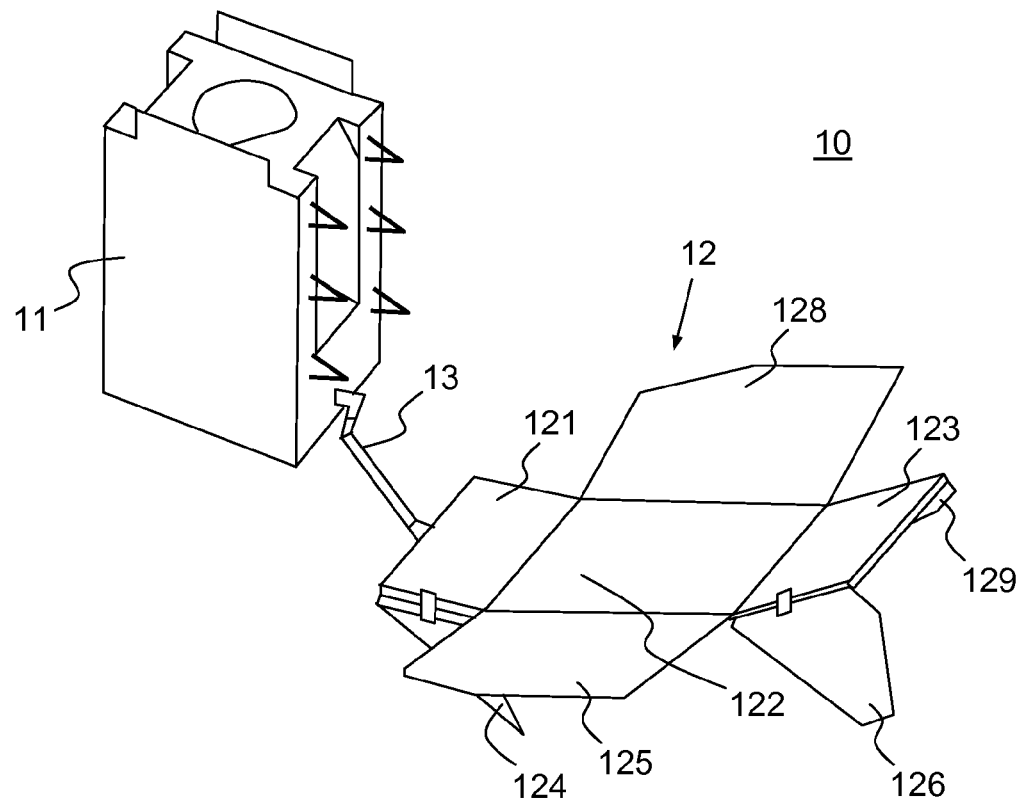
Figure 8H:
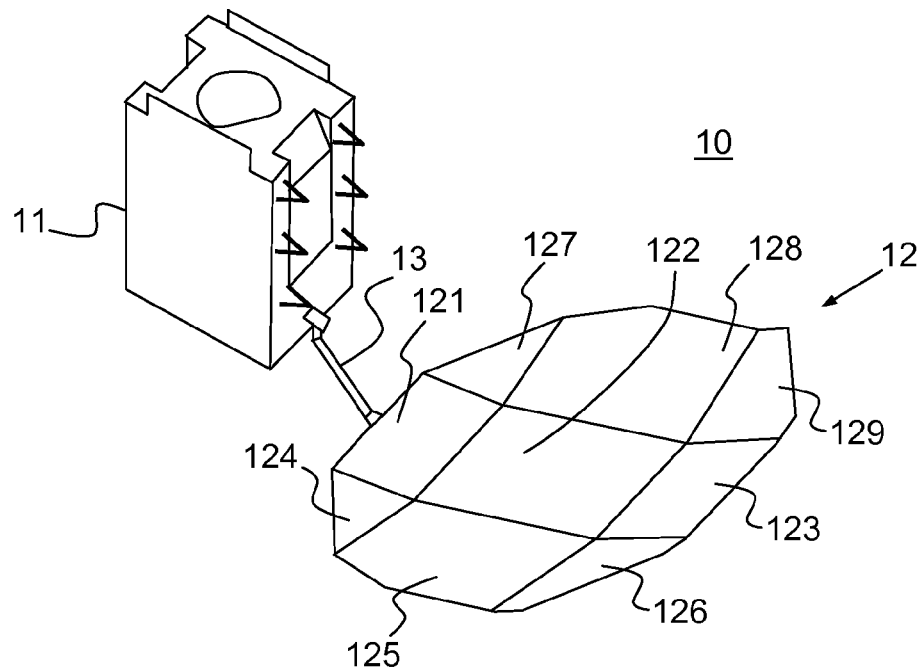

FIGS. 8A to 8H show an example of a deployment kinematic for the primary and secondary panels of the FIG. 1 reflector 12. In FIG. 8A, the reflector 12 is in the stowed configuration, the reflective surface 122A of the primary panel 122 bearing against a face of the body 11 of the satellite 10. FIG. 8B shows the satellite 10 during deployment of the tubular arm 13 to move the reflector 12 away from the body 11. In FIG. 8C, the primary panels 121, 122 and 123 are being deployed. In FIG. 8D, the primary panels 121-123 are in the deployed configuration. In FIG. 8E, the secondary panels 125 and 128 are being deployed relative to the primary panel 122. In FIG. 8F, the primary panels 121-123 and the secondary panels 125 and 128 are in the deployed configuration. In FIG. 8G, the secondary panels 124 and 126 are being deployed. In FIG. 8H, the reflector 12 is in the deployed configuration. Other reflector deployment kinematics may be used, provided that no panel strikes another during its deployment.

In one particular embodiment, the reflector of the invention includes locking devices at the periphery of the overall reflective surface. These locking devices enable improved general stability of the reflector. FIG. 9 shows the FIG. 1 satellite 10 and antenna reflector 12 including such locking devices 130, 131, 132 and 133 positioned at the periphery of the antenna reflector 12, between the panels of each pair of contiguous secondary panels. The locking devices 130-133 are adapted to eliminate at least one degree of freedom between two adjacent panels, in such a manner as to stiffen the reflector in the deployed configuration. Insofar as each secondary panel 124 to 129 is articulated to one of the primary panels 121 to 123, and not to another secondary panel, each locking device 130 to 133 eliminates one degree of freedom between two adjacent panels that are not articulated to each other. The locking devices 130 to 133 are therefore independent of the primary and secondary articulation systems. In order to limit the number of locking devices, the latter devices may advantageously be replaced, in the case of articulated panel joints between the primary and secondary panels, by articulations situated in the exterior corners of the panels, these articulations having a load adsorbing capacity in the deployed configuration.

FIGS. 10A and 10B show an embodiment of a locking device based on a permanent magnet concept. By way of example, FIG. 10A shows the secondary panels 124 and 125 at the end of deployment and FIG. 10B shows the secondary panels 124 and 125 in the deployed and locked configuration. The secondary panel 124 is equipped with a fitting with a male conical end 135 and the secondary panel 125 is equipped with a fitting with a female conical end 136. Each of the two fittings is itself equipped with a permanent magnet 137 and 138, respectively, fastened to each fitting. At the end of deployment, the articulation systems enable the edges of the panels 124 and 125 to be positioned facing each other so that the fitting with the male conical end 135 is nested in the fitting with the female conical end 136. Because of the effect of the magnets 137 and 138 and the resulting magnetic attraction, the two fittings 135 and 136 come into contact and thereafter remain held one against the other.

Figure 11:
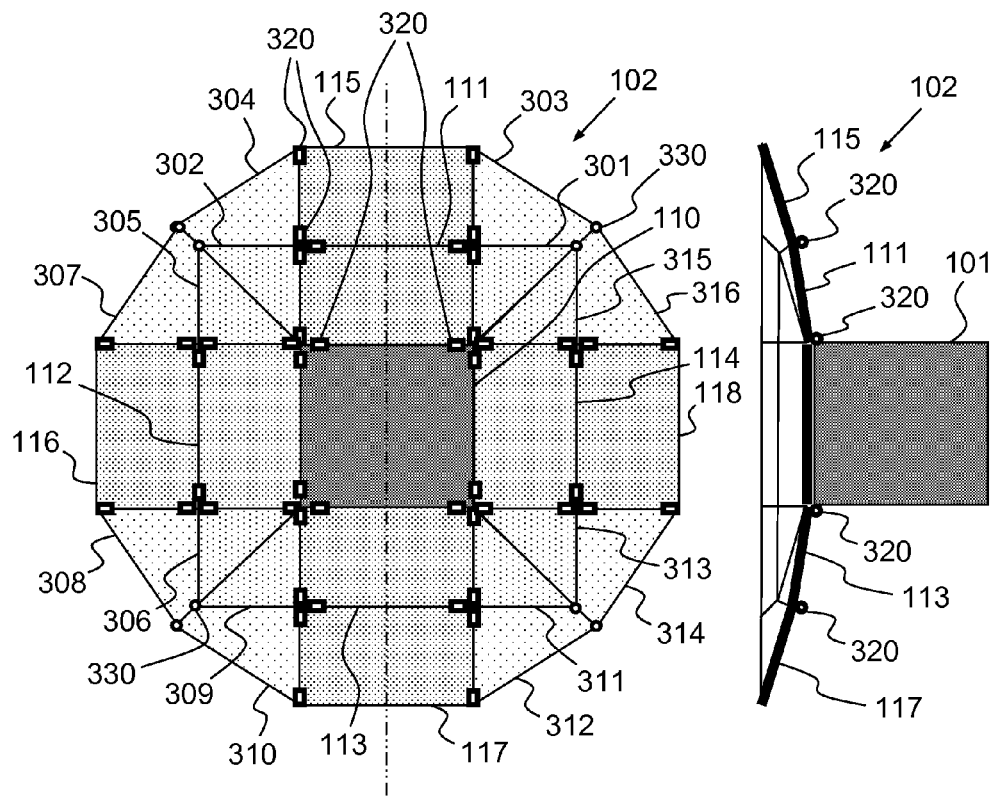
FIG. 11 shows diagrammatically a telecommunication satellite equipped with a thermal shield of the invention in a deployed configuration.

FIG. 11 shows diagrammatically a telecommunication satellite equipped with a thermal shield formed by a deployable structure of the invention in the deployed configuration. The satellite 100 includes a body 101 and a thermal shield 102. The body 101 has a face to which is fixed a central panel 110 of the thermal shield 102. The central panel 110 has a square shape in FIG. 11, but it could have a rectangular shape. Primary panels 111, 112, 113 and 114 abut the central panel 110 on each side of the central panel 110. A respective primary panel 115, 116, 117, 118 abuts each of the primary panels 111-114 on the side opposite the side on which the primary panel 111-114 concerned abuts the central panel 110. Thus the panels 110-114 form a cross. A secondary panel 301 to 316 abuts each primary panel 111-114 on each side on the free sides of those panels in such a manner as to form a substantially continuous overall surface. Articulation systems 320 connect the different panels to each other. Here, each secondary panel 301 to 316 is articulated to one of the primary panels 111 to 114. The articulation systems 320 are of the same type as the primary or secondary articulation systems described above, for example. Locking devices 330 may be provided between the panels of each pair of adjacent secondary panels. As for the antenna reflector shown in FIG. 9, the secondary panels 301 to 316 are not articulated to each other. The locking devices 330 thus enable elimination of one degree of freedom between the panels that are not articulated to each other.

Figures 12A, 12B:
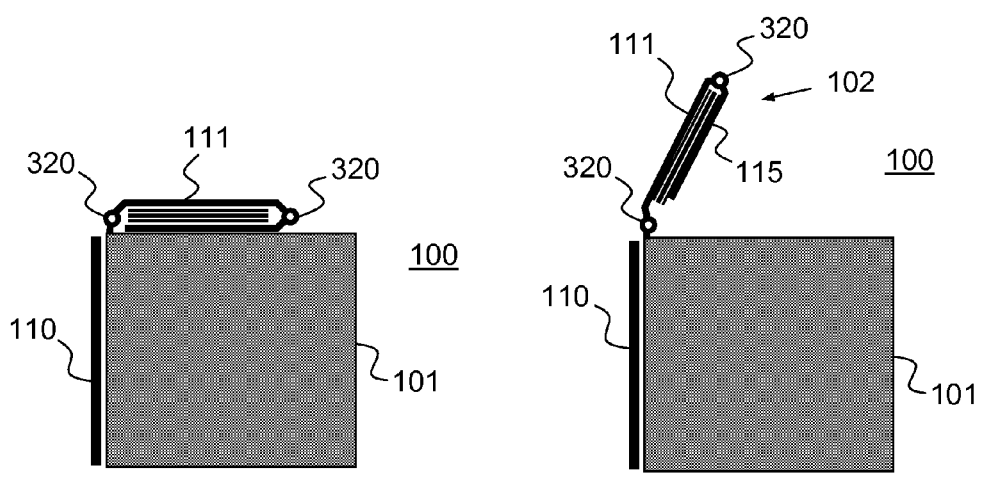
FIGS. 12A to 12F show an example of a primary and secondary panel deployment kinematic for the FIG. 11 thermal shield.
Figure 12C:
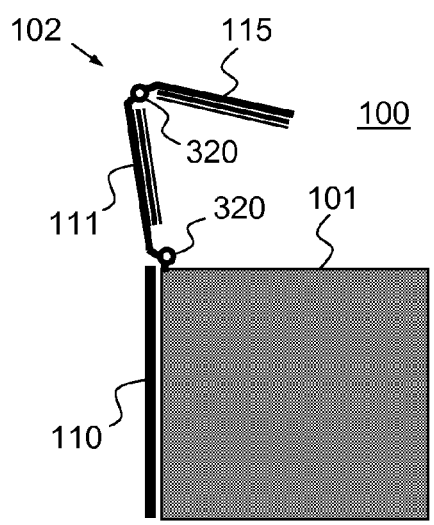
Figure 12D:
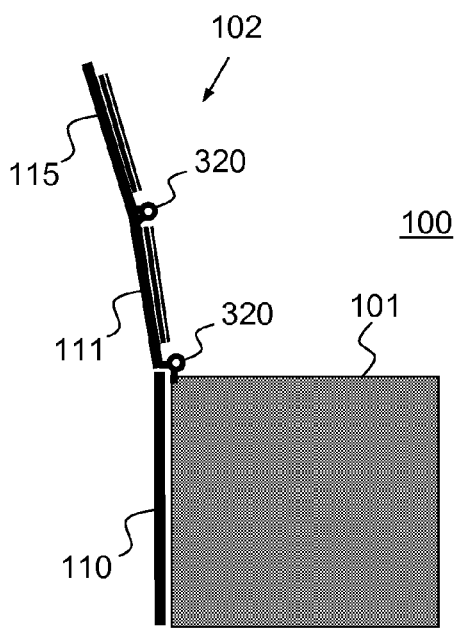
Figure 12E:
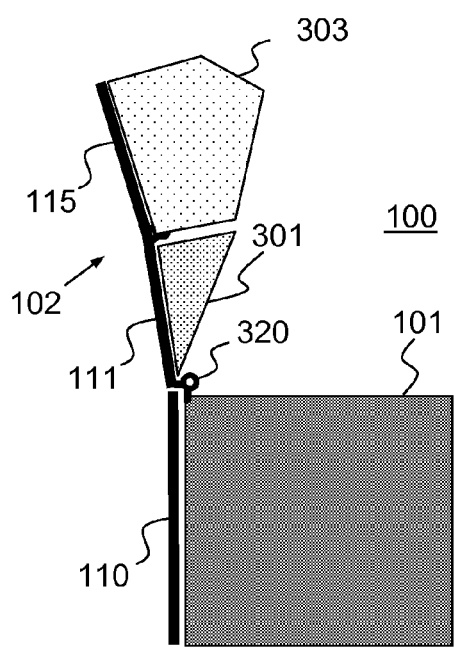
Figure 12F:
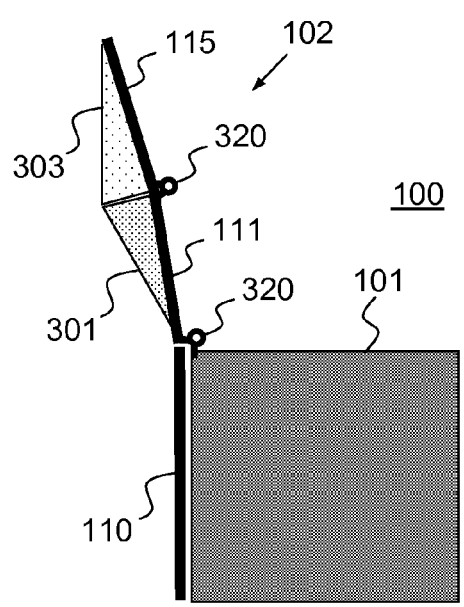

FIGS. 12A to 12H show an example of a deployment kinematic for part of the thermal shield 102 shown in FIG. 11. In FIG. 12A, the primary panels 111 and 115 and the secondary panels 301 to 304 are stacked parallel to each other against a face of the body 101 of the satellite 100. In FIG. 12B, a first articulation system 320 drives the primary panel 111 in rotation relative to the body 101. In FIG. 13B, the primary panel 111 has reached its position corresponding to the deployed configuration. A second articulation system 320 drives the primary panel 112 in rotation relative to the primary panel 111 until the deployed configuration shown in FIG. 12D is reached. In FIG. 12E, articulation systems, not shown, drive the secondary panels 301-304 in rotation relative to the primary panel 111 or 115 that they abut until the deployed configuration shown in FIG. 12F is reached. With the aim of preventing interference in the deployment of the panels, all the panels connected directly or indirectly to one side of the body 101 may be deployed before deploying the panels connected to another side of the body 101.

The invention claimed is:

1. A deployable structure with which a spacecraft may be equipped, comprising:
    a set of primary panels,
    a set of secondary panels, each primary and secondary panel including a substantially plane front surface,
    primary articulation systems, each primary articulation system enabling a primary panel to be caused to pivot relative to another primary panel about a primary axis, the primary axes being substantially parallel to the front surfaces of the primary panels, and
    secondary articulation systems, each secondary articulation system being associated with a secondary panel and enabling said secondary panel to be caused to pivot relative to a primary panel or a secondary panel about a secondary axis substantially parallel to the front surfaces of said panels,
    the deployable structure being configured in such a manner that, in a deployed configuration, the front surfaces of the primary and secondary panels form a substantially continuous overall surface,
    the deployable structure further including locking devices at the periphery of the overall surface, each locking device being configured to eliminate at least one degree of freedom between two adjacent secondary panels that are not articulated to each other by a secondary articulation system, in such manner as to stiffen the reflector in the deployed configuration.

2. A deployable structure according to claim 1, wherein the primary and secondary panels comprise a rigid frame covered with at least one flexible substrate or a panel forming the front surface.

3. A deployable structure according to claim 1, wherein the front surfaces of the primary and secondary panels are reflective surfaces.

4. A deployable structure according to claim 1, wherein each primary articulation system connects one of the primary panels to an adjacent primary panel.

5. A deployable structure according to claim 1, wherein the articulation systems include means for driving the primary and secondary panels into the deployed configuration.

6. A deployable structure according to claim 1, wherein each primary and secondary panel includes a substantially plane rear surface parallel to the front surface of said panel, the articulation systems being fixed to the rear surfaces of the panels.

7. A deployable structure according to claim 6, configured in such a manner that, in a stowed configuration, the primary panels are wound upon themselves, the rear surface of each primary panel facing the rear surface of an adjacent primary panel.

8. A deployable structure according to claim 6, configured in such a manner that, in a stowed configuration, the rear surface of each secondary panel faces the rear surface of the primary or secondary panel on which it is able to pivot.

\* \* \* \* \*